United States Patent Office 2,934,471
Patented Apr. 26, 1960

2,934,471

SYNERGISTIC INSECTICIDE COMPOSITION COMPRISING A PYRETHRUM TYPE TOXICANT, AN INSECTICIDE AND A BUTADIENE FURFURAL CONDENSATION PRODUCT

Roy E. Stansbury, Bartlesville, Okla., assignor to Phillips Petroleum Company, a corporation of Delaware No Drawing. Application August 20, 1956
Serial No. 605,187

10 Claims. (Cl. 167—33)

This invention relates to an improved insecticidal composition and method. In one of its aspects, it relates to an improved insecticide containing a diolefin-furfural reaction product. In another aspect, the invention relates to a method for killing insects employing a composition as described herein.

Pyrethrum (or allethrin)-toxicant insecticide mixtures are widely used to control flies, roaches and other household insects. These sprays contain amounts of pyrethrum which are adjusted to the amount of toxicant, such as DDT, so that the pyrethrum present irritates and activates the insect so as to bring about a more rapid adsorption or intake of the active ingredient. The pyrethrum also acts as a knock-down agent. Various compounds have been used in the past to replace a portion of the pyrethrum present in these mixtures, examples of which are piperonyl compounds, terpene derivatives, or N-substituted amides.

It is an object of this invention to provide a novel insecticidal composition of matter. Another object of the invention is to provide a novel method for killing insects. A further object of the invention is to provide an ingredient for insecticidal compositions and methods permitting increased efficiency of use of pyrethrum and similar materials. A still further object is to provide a composition in which the pyrethrum can be reduced without giving up speed of kill or, if desired, the speed of kill of the pyrethrum already present can be increased. Other aspects, the objects and the several advantages of the invention are apparent from a study of this disclosure and the appended claims.

I have now discovered that the rate of knock-down and/or kill of a pyrethrum- or allethrin-toxicant insecticide mixture can be increased by the addition of a small amount of a compound of the following general formula:

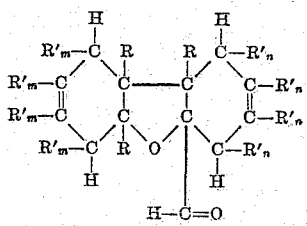

wherein R is selected from the group consisting of hydrogen and methyl, $R'_m$ is selected from the group consisting of hydrogen, methyl and chloro, $R'_n$ is selected from the group consisting of hydrogen, methyl and chloro. At least one R is hydrogen, at least two $R'_m$'s are hydrogen, and at least two $R'_n$'s are hydrogen.

Some examples of compounds of the above general formula which can be employed in the compositions of this invention are: 2,3,4,5-bis($\Delta^2$-butenylene)tetrahydrofurfural, 2,3,4,5-bis(4-methyl-$\Delta^2$-butenylene)tetrahydrofurfural, 2,3-(2-methyl-$\Delta^2$-butenylene)-4,5(3-chloro-$\Delta^2$-butenylene)-3,4-dimethyltetrahydrofurfural, 2,3,4,5-bis-(1-chloro-$\Delta^2$-butenylene)-3-methyltetrahydrofurfural, 2,3,4,5-bis(1-methyl-3-chloro-$\Delta^2$-bentenylene)tetrahydrofurfural, 2,3-(2,3-dichloro-$\Delta^2$-butenylene)-4,5-(2,3-dimethyl-$\Delta^2$-bentenylene)tetrahydrofurfural, and 2,3,4,5-bis(3,4-dichloro-$\Delta^2$-butenylene)tetrahydrofurfural.

Therefore, according to this invention, there is provided an improved insecticidal composition containing pyrethrum or allethrin and also containing a small amount of one of the above-identified compounds.

The additives of this invention are effective when employed in pyrethrum-toxicant insecticides or allethrin-toxicant insecticides in the range between 0.25 and 10 percent by weight. A presently preferred range is from 0.5 to 5 percent by weight.

The additives of this invention are particularly useful in household insecticide mixtures containing pyrethrum or allethrin, especially where the insecticide is to be employed in the form of an aerosol bomb or spray. These materials are also effective, however, where other means of application are to be employed for insecticides containing pyrethrum or allethrin in combination with toxicants such as DDT. While it is not known exactly how the additives of this invention act upon the systems of the insects which are to be killed, it appears that these materials cause, by their repellent nature, the flies or other insects to remain active within the area where the toxic material is available for longer periods of time than when the additives are absent, as evident from the table below. Thus, this invention is based, at least in part, upon the concept of so to speak "charging up" the insect. This theory is best illustrated by a hypothetical case in which an aerosol bomb containing DDT, pyrethrum, and one of the additives of the present invention is sprayed into a chamber containing several hundred houseflies. The pyrethrum irritates the nervous system of the fly so that the fly is more susceptible to the toxic compound, DDT, present. However, the flies are prone to alight on the walls and floor of this chamber, especially on the floor in view of the knock-down effect of the pyrethrum, thus removing them from the area of highest insecticides and knock-down activity, and decreasing the rate by which these flies are knocked down and killed. The compound of this invention, being present in the above specified range, causes, by its repellent nature, the flies to remain in flight for a longer period of time, thus causing the fly to absorb a larger dose of the active insecticide material. This theory by which we explain the increased rate of kill which results when one of the materials of the present invention is employed in insecticides containing pyrethrum or allethrin is well-founded, but we do not wish to restrict our invention to this theory, as these compounds do give an increased rate of kill whatever may be the mode of action. While these materials are most effective on houseflies and roaches, insects such as gnats, fruit flies, and the like can be killed at a faster rate by the use of pyrethrum or allethrin-containing insecticides which contain a small percentage of one of the compounds of the general formula given above.

It will be understood that the range of concentration of the repellent compound above-specified is that in which the best results are now obtainable. The invention is not necessarily limited to said ranges as will be obvious to one skilled in the art who can determine just how far he can go especially on the low side without losing all the desirable effects now obtained and described herein.

EXAMPLE

The insecticides containing DDT with pyrethrum or allethrin were tested with and without small percentages of 2,3,4,5-bis($\Delta^2$-butenylene)tetrahydrofurfural. These tests were carried out by spraying a known amount of the insecticide from an aerosol bomb to be tested into a Peet-Grady chamber in which a known number of houseflies was contained. The Peet-Grady chamber is a chamber of 216 cubic feet capacity (6' x 6' x 6'). The number of flies "knocked down" was counted at various time intervals, and the total number of flies killed after 24 hours was also determined. The results of these tests are expressed below as a table.

Table

| Bomb [1] No. | Grams Sprayed | Number of Flies Knocked Down After— | | | | | | After 24 Hours | | |
|---|---|---|---|---|---|---|---|---|---|---|
| | | 5 Min. | Percent | 10 Min. | Percent | 15 Min. | Percent | Total Dead | Total Originally Present | Percent Dead |
| 1 | 1.35 | 9 | 4 | 19 | 9 | 26 | 12 | 96 | 218 | 44 |
| 2 | 1.15 | 20 | 10 | 32 | 16 | 41 | 20 | 109 | 203 | 54 |
| 3 | 1.31 | 17 | 12 | 22 | 15 | 28 | 20 | 69 | 143 | 48 |
| 4 | 1.25 | 13 | 9 | 25 | 17 | 35 | 23 | 114 | 150 | 76 |

[1] Bomb recipes given below:

| Compound | Bomb #1, Wt. Percent | Bomb #2, Wt. Percent | Bomb #3, Wt. Percent | Bomb #4, Wt. Percent |
|---|---|---|---|---|
| Pyrethrum | 0.4 | 0.4 | 0.4 | 0.4 |
| DDT | 2.0 | 2.0 | 2.0 | 2.0 |
| Aromatic Oil (B.P. 245-315° F.) | 12.6 | 11.6 | 12.6 | 11.6 |
| Freon 11 | 40.0 | 40.0 | 40.0 | 40.0 |
| Freon 12 | 45.0 | 45.0 | 45.0 | 45.0 |
| 2,3,4,5-bis(Δ²-butenylene)tetrahydrofurfural | | 1.0 | | 1.0 |

From the foregoing experimental work, it is evident that the inclusion of small amounts of a compound having the general configuration as herein set forth and described will result in an improved rate of kill and/or knock-down of a pyrethrum or similar ingredient containing insecticidal compositions.

Patent 2,572,577, issued October 23, 1951, to Caroline E. Tissol, describes and claims a method for repelling insects using a compound as described herein.

In lieu of the DDT, there can be employed in the present invention a chlorinated hydrocarbon which is a residual insecticide, i.e., one which exhibits long-acting kill. By "long-acting" kill, it is intended to convey that the insecticide requires a period of time to kill the insects which are present and does not do so instantaneously. Some examples of other insecticides which can be used are chlordane, dieldrin, aldrin, and lindane, which are, respectively and chemically speaking, 1,2,4,5,6,7,8,8-octachloro-4,7 - methano - 3a,4,7,7a - tetrahydroindane, 1,2,3,4,10,10-hexachloro - 6,7 - epoxy - 1,4,4a,5,6,7,8,8a - octahydro-1,4,5,8 - dimethanenaphthalene, 1,2,3,4,10,10 - hexachloro-1,4,4a,5,8,8a-hexahydro - 1,4,5,8 - dimethanenaphthalene, and 1,2,3,4,5,6 - hexachlorocyclohexane-(gamma isomer). Toxaphene, a chlorinated camphene whose empirical formula is $C_{10}H_{10}Cl_8$, is another example of an insecticide which can be employed.

The amounts of pyrethrum or allethrin present in the composition of the invention will ordinarily be in the now preferred range of 0.025 to 0.1 percent by weight. The amount of insecticide will ordinarily be in the now preferred range of from about 0.5 to 75 parts by weight of insecticide per part by weight of pyrethrum or allethrin. For example, a ratio of DDT to pyrethrum of 60:1 is used. If lindane is used, the ratio can be 1:1.

Reasonable variation and modification are possible within the scope of the foregoing disclosure and the appended claims to the invention the essence of which is that small amounts of a certain diolefin-furfural reaction product has been found to somehow increase the rate of kill and/or knock-down of insecticides, especially those containing pyrethrum or allethrin. Clearly, it appears that the configuration of the nuclear aldehyde group has some specific action upon the insect probably repelling the same and causing it to be "charged up" as described.

I claim:

1. A method for increasing the rate of kill and knock-down of a pyrethrum-type toxicant and an insecticide containing mixture which comprises adding thereto a small repellent amount of a compound of the following general formula:

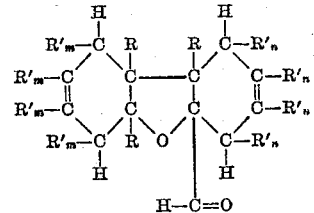

wherein R is selected from the group consisting of hydrogen and methyl, $R'_m$ is selected from the group consisting of hydrogen, methyl and chloro, $R'_n$ is selected from the group consisting of hydrogen, methyl and chloro, at least one R is hydrogen, at least two $R'_m$'s are hydrogen, and at least two $R'_n$'s are hydrogen.

2. A method of killing insects which comprises applying to insects an insecticidal composition comprising an insecticidal ingredient, a pyrethrum-type toxicant, and a small repellent and synergistic amount of a compound having the following general structural characteristics:

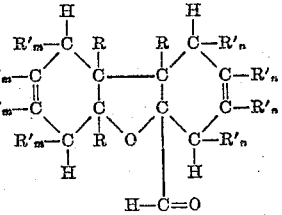

wherein R is selected from the group consisting of hydrogen and methyl, $R'_m$ is selected from the group consisting of hydrogen, methyl and chloro, $R'_n$ is selected from the group consisting of hydrogen, methyl and chloro, at least one R is hydrogen, at least two $R'_m$'s are hydrogen, and at least two $R'_n$'s are hydrogen.

3. A method according to claim 1 wherein the compound is 2,3,4,5-bis(Δ²-butenylene)tetrahydrofurfural.

4. A novel synergistic insecticidal composition of matter comprising an active insecticidal ingredient, a material selected from the group consisting of pyrethrum and allethrin, and a synergistic proportion of 2,3,4,5,bis(Δ²-butenylene)tetrahydrofurfural.

5. A composition according to claim 4 wherein the insecticidal ingredient is DDT and the 2,3,4,5-bis(Δ²-butenylene)tetrahydrofurfural is in the range of 0.25-10 percent by weight.

6. A composition according to claim 4 wherein the insecticidal ingredient is at least one of the following: chlordane, dieldrin, aldrin, toxaphene and lindane.

7. A method of killing an insect which comprises applying to said insect a composition comprising at least one of pyrethrum and allethrin in the range of 0.025 to 0.1 percent by weight of the composition, an insecticidal ingredient present in the range of from about 0.5 to 75 parts by weight of said pyrethrum or allethrin and 0.25–10% by weight of 2,3,4,5-bis($\Delta^2$-butenylene)tetrahydrofurfural.

8. An insecticidal composition comprising by weight percent the following ingredients: pyrethrum, 0.4; DDT, 2; aromatic oil, 11.6; Freon 11, 40; Freon 12, 45; 2,3,4,5-bis ($\Delta^2$-butenylene)tetrahydrofurfural, 1.

9. A method for killing house flies which comprises applying to said flies a composition containing at least one of pyrethrum and allethrin, an insecticidal ingredient which has the power to kill said flies over a period of time, and a synergistic proportion of at least one compound having the following general structural characteristics:

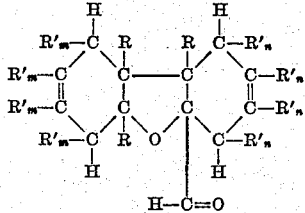

wherein R is selected from the group consisting of hydrogen and methyl, $R'_m$ is selected from the group consisting of hydrogen, methyl and chloro, $R'_n$ is selected from the group consisting of hydrogen, methyl and chloro, at least one R is hydrogen, at least two $R'_m$'s are hydrogen, and at least two $R'_n$'s are hydrogen.

10. A method according to claim 1 wherein said compound is present in an amount by weight in the range of 0.25–10 percent.

References Cited in the file of this patent
UNITED STATES PATENTS

| | | |
|---|---|---|
| 2,572,577 | Tissol et al. | Oct. 23, 1951 |
| 2,687,419 | Hillyer | Aug. 24, 1954 |
| 2,720,497 | Hillyer | Oct. 11, 1955 |
| 2,760,946 | Hillyer | Aug. 28, 1956 |

OTHER REFERENCES

Synergism and Antagonism as Displayed by Certain Antibacterial Substances, The Lancet, vol. 2, July 1950, pp. 46–50.

Screening Test for Materials to Increase Effectiveness of a DDT Pyrethrum Formula, U.S. Dept. Agr., Bur. of Entomol. and Plant Quarantine, E–775, April 1949, pp. 1–4, 19, 26.

Wadley: Evidence Required to Show Synergistic Action of Insecticides and a Short Cut in Analysis, Bur. Entomol. and Plant Quarantine, June 1945, ET–223, pp. 1–8.